(12) United States Patent
Ko et al.

(10) Patent No.: US 11,010,071 B2
(45) Date of Patent: May 18, 2021

(54) SOLID STATE DRIVE THAT ALLOCATES STREAM DATA TO SUPER BLOCKS BASED ON STREAM INFORMATION AND A MEMORY ALLOCATION METHOD THEREOF

(71) Applicant: SAMSUNG ELECTRONICS CO., LTD., Suwon-si (KR)

(72) Inventors: Min Seok Ko, Seoul (KR); Joo Young Hwang, Suwon-si (KR); In Hwan Doh, Seoul (KR); Chul Lee, Hwaseong-si (KR); Jae Yoon Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 80 days.

(21) Appl. No.: 16/266,187

(22) Filed: Feb. 4, 2019

(65) Prior Publication Data

US 2020/0012444 A1 Jan. 9, 2020

(30) Foreign Application Priority Data

Jul. 6, 2018 (KR) .......................... 10-2018-0078729

(51) Int. Cl.
*G06F 3/06* (2006.01)

(52) U.S. Cl.
CPC .......... *G06F 3/0631* (2013.01); *G06F 3/0604* (2013.01); *G06F 3/064* (2013.01); *G06F 3/0679* (2013.01)

(58) Field of Classification Search
CPC ...... G06F 3/0631; G06F 3/0604; G06F 3/064; G06F 3/0679; G06F 12/00; G06F 13/00
See application file for complete search history.

(56) References Cited

U.S. PATENT DOCUMENTS

| 5,752,252 A | 5/1998 | Zbikowski et al. |
| 8,954,690 B2 | 2/2015 | Lawrence |

(Continued)

FOREIGN PATENT DOCUMENTS

CN 107783734 3/2018

OTHER PUBLICATIONS

Machine Translation of CN107783734, original publication date Mar. 9, 2018 (translation downloaded from Espacenet Jul. 18, 2020) , 27 pages.*

(Continued)

*Primary Examiner* — Tuan V Thai
(74) *Attorney, Agent, or Firm* — F. Chau & Associates, LLC

(57) ABSTRACT

A solid state drive includes: a plurality of non-volatile memories, each of the non-volatile memories connected to a channel, the channel connected to at least one way connected to a die; a host interface which receives stream data and stream information from a host; and a resource allocator which allocates the stream data to super blocks of the plurality of non-volatile memories on the basis of the stream information. A super block includes a unit super block, and the unit super block includes a block of a first die corresponding to a first channel and connected to a plurality of the ways connected to the first channel. The stream data may include stream groups, and the stream information may include the number of streams included in a stream group. A performance factor of a stream or stream group an extent size of a stream, and an allocation position of the stream, may also be included in the stream information.

15 Claims, 14 Drawing Sheets

(56) References Cited

U.S. PATENT DOCUMENTS

| | | |
|---|---|---|
| 9,535,625 B2 | 1/2017 | Raciborski et al. |
| 9,898,200 B2 | 2/2018 | Yang et al. |
| 2010/0228940 A1* | 9/2010 | Asnaashari ......... G06F 12/0246 |
| | | 711/170 |
| 2015/0248242 A1 | 9/2015 | Lim et al. |
| 2015/0378884 A1 | 12/2015 | Nemazie et al. |
| 2016/0291872 A1 | 10/2016 | Hashimoto et al. |
| 2016/0357776 A1 | 12/2016 | Sundaram et al. |
| 2017/0075832 A1 | 3/2017 | Bhimani et al. |
| 2017/0272494 A1* | 9/2017 | Huen .................... G06F 3/0659 |
| 2017/0286286 A1 | 10/2017 | Szubbocsev |
| 2018/0129453 A1 | 5/2018 | Kim |
| 2018/0136865 A1* | 5/2018 | Erlihson ............... G06F 3/0679 |
| 2018/0188962 A1* | 7/2018 | Ji ........................ G06F 12/0246 |
| 2019/0114112 A1* | 4/2019 | Lin ..................... G06F 12/0284 |

OTHER PUBLICATIONS

Singapore Search Report and Written Opinion dated Jan. 21, 2020 and Feb. 11, 2020 issued in corresponding application No. 10201901589, 11 pages.

Office Action issued in corresponding Indian Patent Application No. 201944020440 dated Feb. 1, 2021.

* cited by examiner

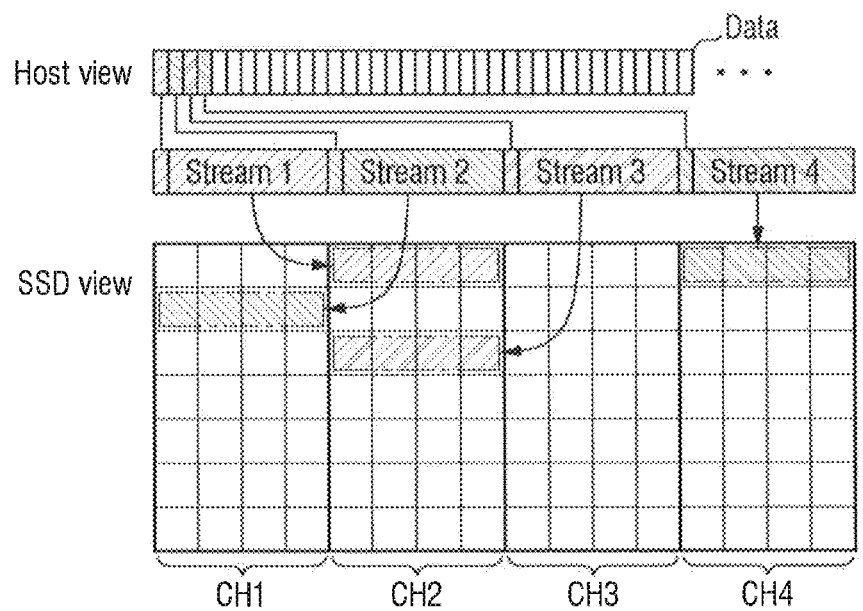

Fig. 9

| Stream # | Physical Block |
|---|---|
| 1 | 0, 4, 8, 12, ..... |
| 2 | 1, 2, 9, 10, ..... |
| ⋮ | |
| n | ..... |

Fig. 10

| Group # | Stream |
|---|---|
| 1 | 1, 2, 3, 4 |
| 2 | 5, 6, 7, 8 |
| 3 | 9, 10 |
| 4 | 11 |
| ⋮ | |

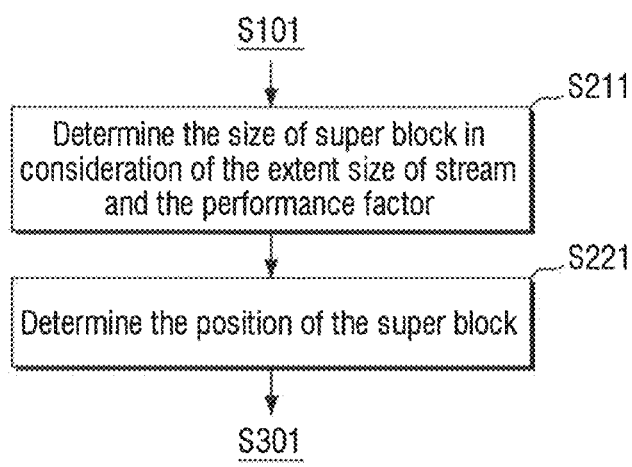

SOLID STATE DRIVE THAT ALLOCATES STREAM DATA TO SUPER BLOCKS BASED ON STREAM INFORMATION AND A MEMORY ALLOCATION METHOD THEREOF

CROSS-REFERENCE TO RELATED APPLICATION

This application claims priority under 35 U.S.C. § 119 to Korean Patent Application No. 10-2018-0078729 filed on Jul. 6, 2018 in the Korean Intellectual Property Office, the disclosure of which is incorporated by reference herein in its entirety.

1. TECHNICAL FIELD

The present inventive concept relates to a solid state drive and a memory allocation method thereof.

2. DESCRIPTION OF THE RELATED ART

Traditionally, a magnetic disk was the primary computer data storage device. However, a solid state drive (SSD) device, which uses a non-volatile memory instead of a magnetic disk for storage, is increasingly being used in computer systems and portable devices.

The non-volatile memory of the SSD device may be a flash memory and may include various design considerations. Such considerations may include strategies for efficiently utilizing storage capacity. For example, when previously stored data values are updated to the flash memory, the pages currently storing the data values are internally flagged as invalid and the updated data values are stored in new pages.

When the data is deleted, the pages storing the data are similarly flagged as invalid. Invalid pages may be recovered via a process called garbage collection. Garbage collection operates at a block level including a plurality of pages. If the garbage collection waits until one block is completely empty (e.g., until all the pages in the block are invalidly flagged), the SSD may not have free pages on which to write the data. Therefore, execution of garbage collection requires valid pages to be moved to other blocks from the deletion target block.

Since this garbage collection technique consumes a lot of resources, it can reduce the speed and performance of the SSD.

SUMMARY

According to an exemplary embodiment of the present inventive concept, there is provided a solid state drive comprising a plurality of non-volatile memories, each of the non-volatile memories including a channel, the channel including at least one way connected to a die; a host interface which receives stream data and stream information from a host; and a resource allocator which allocates the stream data to super blocks of the plurality of non-volatile memories on the basis of the stream information, wherein a first super block includes a first unit super block, and the first unit super block includes a block of a first die corresponding to a first channel and connected to a plurality of ways included in the first channel.

According to an exemplary embodiment of the present inventive concept, there is provided a solid state drive comprising a plurality of non-volatile memories; and a solid state drive controller which receives a plurality of streams and stream information from a host, defines a position and a size of a super block in which each of the streams in the non-volatile memories is to be stored according to the stream information, and allocates each of the streams to its corresponding super block.

According to an exemplary embodiment of the present inventive concept, there is provided a memory allocation method of a solid state drive, the method comprising receiving stream data and stream information from a host; defining a super block in a non-volatile memory on the basis of the stream information, the super block including a unit super block, the unit super block corresponding to a channel and including a block of a die connected to a plurality of ways included in the channel; and allocating the stream data to the super block.

According to an exemplary embodiment of the present inventive concept, there is provided a solid state drive comprising: a plurality of non-volatile memories, each of the non-volatile memories including a channel, the channel including at least one way connected to a die; a host interface which receives stream data and stream information from a host; and a resource allocator which allocates the stream data to blocks of the plurality of non-volatile memories according to the stream information, wherein one of the blocks includes a stream group, the stream group including a first stream allocated to a first row of a first channel, a second stream allocated to a first row of a second channel, a third stream allocated to a first row of a third channel and a fourth stream allocated to a first row of a fourth channel, wherein the first rows of each of the first, second, third and fourth channels are adjacent to each other.

BRIEF DESCRIPTION OF THE DRAWINGS

The above and other features of the present inventive concept will become more apparent by describing in detail exemplary embodiments thereof with reference to the attached drawings, in which:

FIG. 7 is a diagram illustrating the memory allocation operation of the resource allocator of FIG. 5 in which data is divided into multiple streams;

FIG. 8 is a block diagram illustrating the internal operations of the solid state drive controller of FIG. 5.

FIG. 9 is an exemplary table illustrating a mapping table of FIG. 8;

FIG. 10 is an exemplary table illustrating a grouping table of FIG. 8;

FIG. 23 is a flowchart illustrating the super block definition steps of FIG. 22 in detail.

DETAILED DESCRIPTION OF THE EMBODIMENTS

Hereinafter, a solid state drive according to exemplary embodiments of the present inventive concept will be described with reference to FIGS. 1 to 13.

Figure 1:
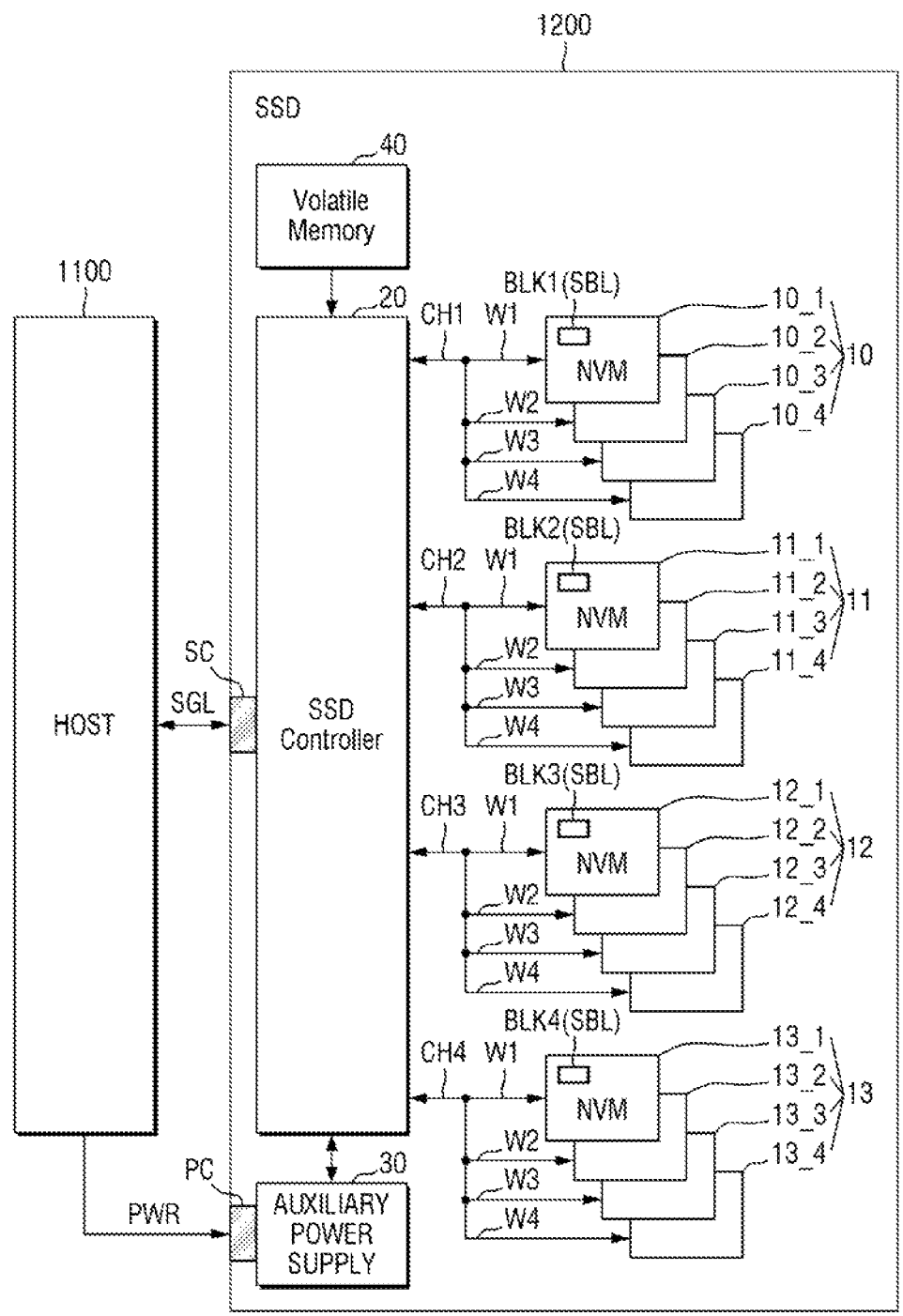
FIG. 1 is a block diagram illustrating a solid state drive system according to an exemplary embodiment of the present inventive concept.

FIG. 1 is a block diagram illustrating a solid state drive system according to an exemplary embodiment of the present inventive concept.

Referring to FIG. 1, the solid state drive system includes a host 1100 and a solid state drive (SSD) 1200.

The solid state drive 1200 may include a plurality of non-volatile memory devices 10, 11, 12 and 13 and a solid state drive controller 20.

The plurality of non-volatile memory devices 10, 11, 12 and 13 may be used as a storage medium of the solid state drive 1200. Each of the plurality of non-volatile memory devices 10, 11, 12 and 13 may include a flash memory device.

The solid state drive controller 20 is connected to each of the plurality of non-volatile memory devices 10, 11, 12 and 13 via a plurality of channels CH1, CH2, CH3 and CH4. In FIG. 1, the number of the channels may be four; however, the present inventive concept is not limited thereto. For example, the solid state drive according to exemplary embodiments of the present inventive concept may have three or less channels or five or more channels.

A plurality of non-volatile memory devices may be connected to one channel, and the number of the non-volatile memories connected to one channel may be referred to as a bank or a way. Each way may be connected to a single die or chip.

For example, the first channel CH may be connected to a first way W1, a second way W2, a third way W3 and a fourth way W4. The first way W1 is connected to a first die 10_1 and the second way W2 is connected to a second die 10_2. The third way W3 is connected to a third die 10_3, and the fourth way W4 is connected to a fourth die 10_4. In other words, the first non-volatile memory device 10 may include four dies, e.g., the first die 10_1, the second die 10_2, the third die 10_3 and the fourth die 10_4.

The second channel CH2 is also connected to four ways, e.g., a first way W1, a second way W2, a third way W3 and a fourth way W4, and each way may be connected to four dies 11_1, 11_2, 11_3 and 11_4, respectively. The second non-volatile memory device 11 may include four dies, e.g., a first die 11_1, a second die 11_2, a third die 11_3 and a fourth die 11_4.

The third channel CH3 is also connected to four ways, e.g., a first way W1, a second way W2, a third way W3 and a fourth way W4, and each way may be connected to four dies 12_1, 12_2, 12_3 and 12_4, respectively. The third non-volatile memory device 12 may include four dies, e.g., a first die 12_1, a second die 12_2, a third die 12_3 and a fourth die 12_4.

The fourth channel CH4 is also connected to four ways, e.g., a first way W1, a second way W2, a third way W3 and a fourth way W4, and each way may be connected to four dies 13_1, 13_2, 13_3 and 13_4, respectively. The fourth non-volatile memory device 13 may include four dies, e.g., a first die 13_1, a second die 13_2, a third die 13_3 and a fourth die 13_4.

Although the number of dies connected to one channel is illustrated as four, the present inventive concept is not limited thereto. For example, the number of the non-volatile memories connected to one channel may be eight.

The solid state drive controller 20 may transmit and receive a signal SGL to and from the host 1100 via a signal connector SC. Here, the signal SGL may include commands, addresses, data, and the like. The solid state drive controller 20 may write data to the plurality of non-volatile memory devices 10, 11, 12 and 13 in accordance with a command from the host 1100, or may read data from the plurality of non-volatile memory devices 10, 11, 12 and 13 in accordance with the command of the host 1100.

The solid state drive 1200 may further include an auxiliary power supply device 30. The auxiliary power supply device 30 may receive input of the power supply PWR from the host 1100 via a power supply connector PC and may supply the power to the solid state drive controller 20.

The auxiliary power supply device 30 may be located inside or outside the solid state drive 1200. For example, the auxiliary power supply device 30 may be located on a main board and may provide an auxiliary power supply to the solid state drive 1200.

The solid state drive 1200 may further include a volatile memory device 40. The volatile memory device 40 operates as an input/output buffer of the solid state drive controller 20. For example, in a write mode, the solid state drive controller 20 may store the data received from the host 1100 in the volatile memory device 40, and may write the data stored in the volatile memory device 40 to the plurality of non-volatile memory devices 10, 11, 12 and 13. Further, in a read mode, the solid state drive controller 20 may store the data read from the plurality of non-volatile memory devices 10, 11, 12 and 13 in the volatile memory device 40, and may provide the data stored in the volatile memory device 40 to the host 1100.

The volatile memory device 40 may include a Dynamic Random Access Memory (DRAM) device. However, the present inventive concept is not limited thereto.

Each of the plurality of non-volatile memory devices 10, 11, 12 and 13 may include a plurality of memory blocks BLK1, BLK2, BLK3 and BLK4.

The memory blocks BLK1, BLK2, BLK3 and BLK4 of the plurality of non-volatile memory devices 10, 11, 12 and 13 may form a single super block SBL. The super block SBL may be a set of the blocks BLK1, BLK2, BLK3 and BLK4, wherein the set is an erase unit of a particular non-volatile memory device. For example, the super block SBL may be a set of the blocks connected to the channels CH1, CH2, CH3 and CH4 that are different from each other.

The solid state drive controller 20 maps a stream and a super block SBL. When supporting a multi-stream, the solid state drive controller 20 may map different super blocks SBL for each stream. The stream and the super block SBL may be mapped on a one-to-one basis. Alternatively, the stream and the super block SBL may be mapped in a one-to-many or many-to-one relationship.

Further, the solid state drive controller 20 may operate each of the plurality of memory blocks BLK1, BLK2, BLK3 and BLK4 included in the plurality of non-volatile memory devices 10, 11, 12 and 13 in a single level cell (SLC) mode, a multi-level cell (MLC) mode, or a triple level cell (TLC) mode.

When the memory blocks BLK1, BLK2, BLK3 and BLK4 included in each of the plurality of non-volatile memory devices 10, 11, 12 and 13 operate in the SLC mode, the memory cells included in a particular memory block may store data of one bit.

When the memory blocks BLK1, BLK2, BLK3 and BLK4 included in each of the plurality of non-volatile memory devices 10, 11, 12 and 13 operate in the MLC mode, the memory cells included in a particular memory block may store data of two bits.

When the memory blocks BLK1, BLK2, BLK3 and BLK4 included in each of the plurality of non-volatile memory devices 10, 11, 12 and 13 operate in the TLC mode, the memory cells included in a particular memory block may store data of three bits.

The solid state drive controller 20 may dividedly store the plurality data in a memory block operating in the SLC mode, a memory block operating in the MLC mode, or a memory block operating in the TLC mode, on the basis of an access pattern of the plurality of data stored in the plurality of non-volatile memory devices 10, 11, 12 and 13.

Detailed operations of the solid state drive controller 20 will be described later.

Figure 2:
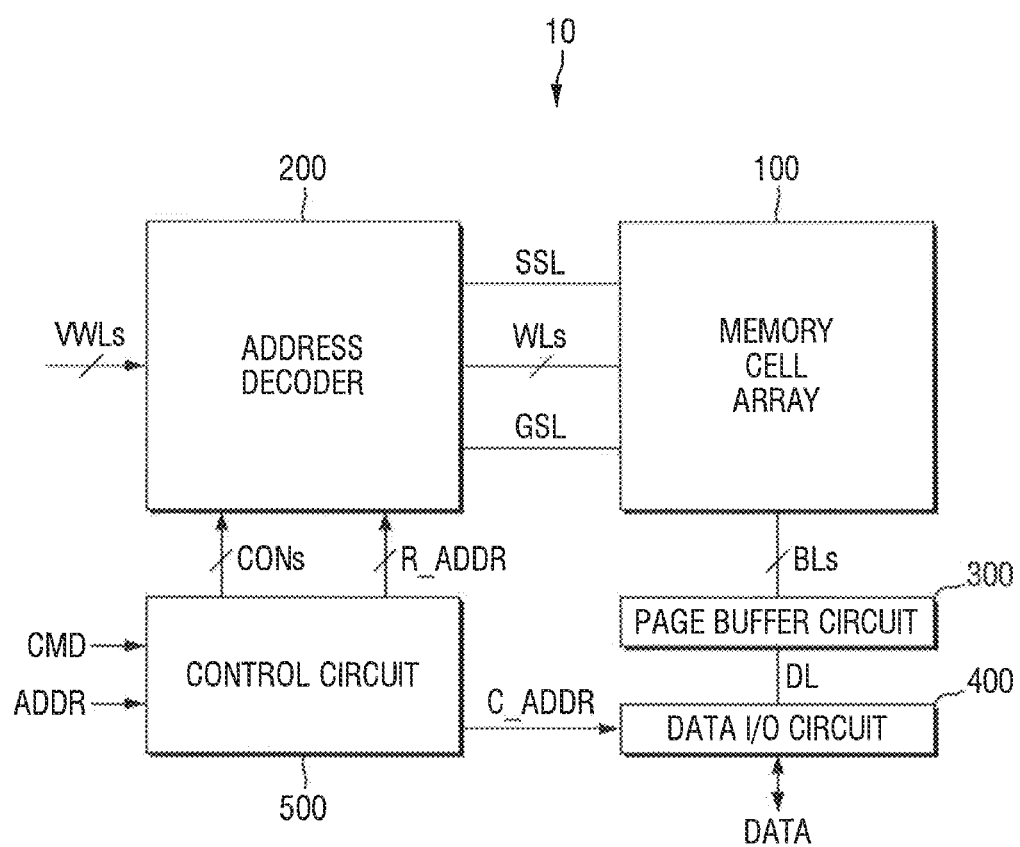
FIG. 2 is a block diagram illustrating the non-volatile memory of FIG. 1 in detail.

FIG. 2 is a block diagram illustrating the non-volatile memory of FIG. 1 in detail.

Referring to FIG. 2, the first to fourth non-volatile memories 10, 11, 12 and 13 of FIG. 1 may be implemented like the first non-volatile memory 10 of FIG. 2.

The first non-volatile memory 10 may include a memory cell array 100, an address decoder 200, a page buffer circuit 300, a data input/output circuit 400, and a control circuit 500.

The memory cell array 100 may be connected to the address decoder 200 via a string selection line SSL, a plurality of word lines WLs, and a ground selection line GSL. Furthermore, the memory cell array 100 may be connected to the page buffer circuit 300 via a plurality of bit lines BLs.

The memory cell array 100 may include the plurality of memory blocks BL1, BL2, BL3 and BL4, and each of the plurality of memory blocks BL1, BL2, BL3 and BL4 may include a plurality of memory cells connected to a plurality of word lines WLs and a plurality of bit lines BLs.

In an exemplary embodiment of the present inventive concept, the memory cell array 100 may be a three-dimensional memory cell array formed as a three-dimensional (or vertical) structure on a substrate. In this case, the memory cell array 100 may include vertical memory cell strings including a plurality of memory cells stacked on each other.

In another exemplary embodiment of the present inventive concept, the memory cell array 100 may be a two-dimensional memory cell array formed as a two-dimensional (or horizontal) structure on the substrate.

Figure 3:
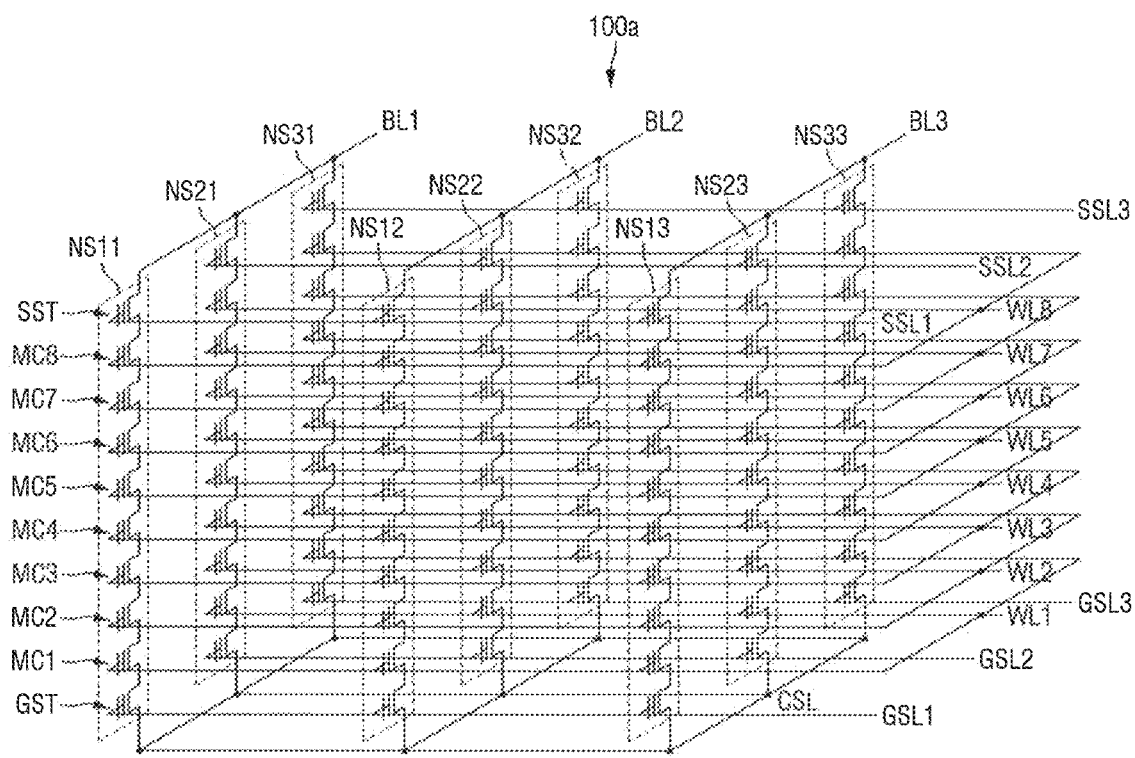
FIG. 3 is an equivalent circuit diagram illustrating a memory cell array of FIG. 2 in detail in which the memory cell array is a three-dimensional memory cell array.

FIG. 3 is an exemplary equivalent circuit diagram illustrating the memory cell array of FIG. 2 in detail.

A memory cell array 100a of FIG. 3 may correspond to the memory cell array 100 of FIG. 2. The memory cell array 100a illustrated in FIG. 3 is a three-dimensional memory cell array formed as a three-dimensional structure on a substrate. For example, a plurality of memory cell strings included in the memory cell array 100a may be formed in a direction perpendicular to the substrate.

Referring to FIG. 3, the memory cell array 100a may include a plurality of memory cell strings NS11, NS12, NS13, NS21, NS22, NS23, NS31, NS32 and NS33 connected between the bit lines BL, BL2 and BL3 and the common source line (CSL). Each of the plurality of memory cell strings NS1 to NS33 may include a string selection transistor (SST), a plurality of memory cells (MC1, MC2, MC3, MC4, MC5, MC6, MC7, and MC8) and a ground selection transistor (GST).

Although FIG. 3 illustrates that each of the plurality of memory cell strings NS11 to NS33 includes eight memory cells (MC1, MC2, ..., MC8), the present inventive concept is not limited thereto.

The string selection transistors (SST) may be connected to corresponding string selection lines SSL1, SSL2 and SSL3. The plurality of memory cells (MC1, MC2, ..., MC8) may be connected to corresponding word lines (WL1, WL2, WL3, WL4, WL5, WL6, WL7, and WL8), respectively. The ground selection transistors (GST) may be connected to corresponding ground selection lines (GSL1, GSL2 and GSL3). The string selection transistors (SST) may be connected to the corresponding bit lines (BL1, BL2 and BL3), and the ground selection transistors (GST) may be connected to the common source line (CSL).

The word lines (e.g., WL1) of the same height are commonly connected, and the ground selection lines (GSL1, GSL2 and GSL3) and the string selection lines (SSL1, SSL2 and SSL3) may be separated, respectively.

Although FIG. 3 illustrates that the memory cell array 100a is connected to eight word lines (WL1, WL2, ..., WL8) and three bit lines (BL1, BL2 and BL3), the present inventive concept is not limited thereto.

Figure 4:
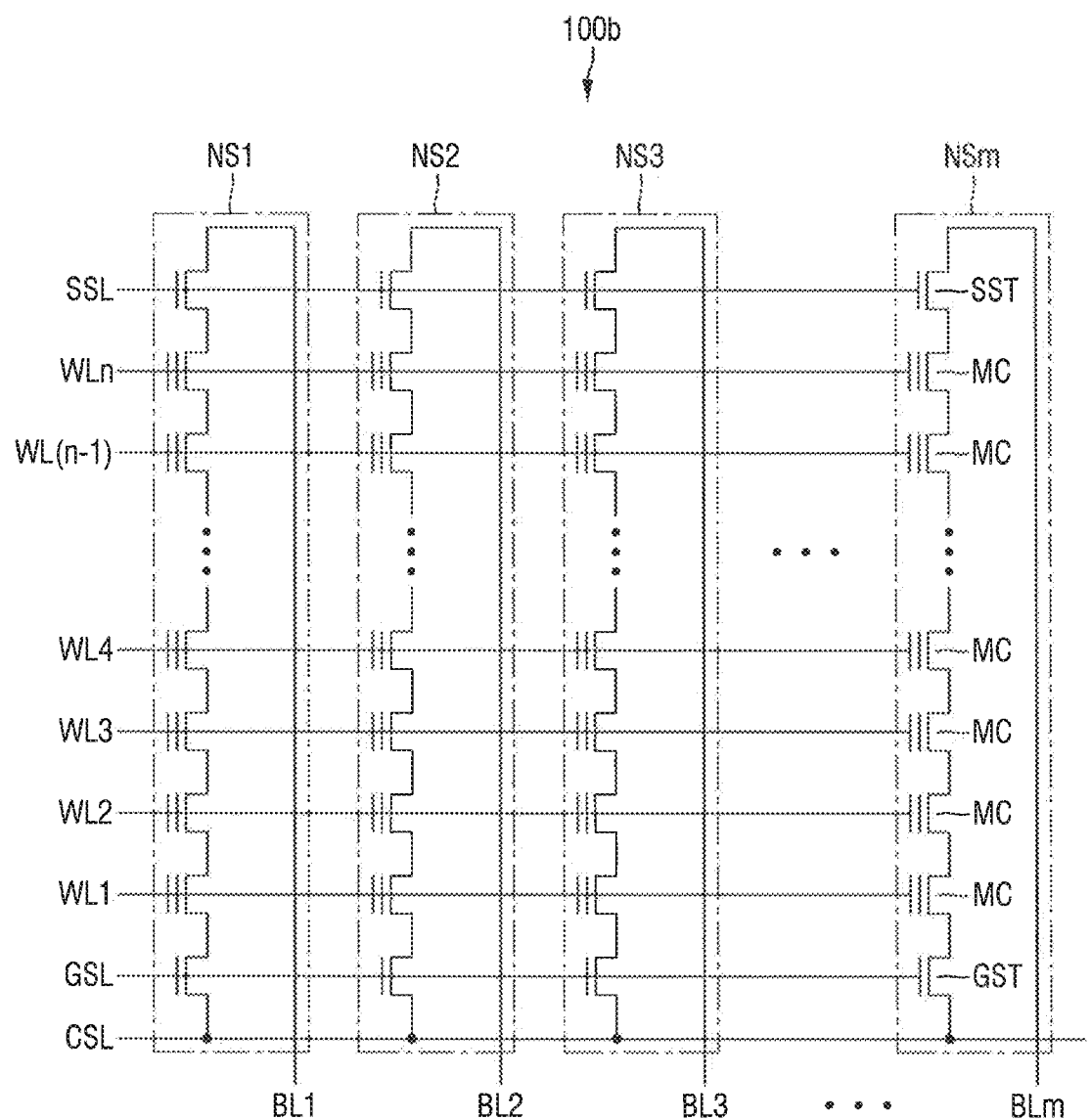
FIG. 4 is an equivalent circuit diagram illustrating the memory cell array of FIG. 2 in detail in which the memory cell array is a two-dimensional memory cell array.

FIG. 4 is an exemplary equivalent circuit diagram illustrating the memory cell array of FIG. 2 in detail.

A memory cell array 100b of FIG. 4 may correspond to the memory cell array 100 of FIG. 2. The memory cell array 100b illustrated in FIG. 4 is a two-dimensional memory cell array formed as a two-dimensional structure on a substrate.

For example, a plurality of memory cell strings included in the memory cell array 100*b* may be formed in a direction horizontal to the substrate.

Referring to FIG. 4, the memory cell array 100*b* may include a plurality of memory cell strings (NS1, NS2, NS3, . . . , NSm).

Each of the plurality of memory cell strings (NS1, NS2, NS3, . . . , NSm) may include a string selection transistor (SST), a plurality of memory cells (MC) and a ground selection transistor (GST) which are connected in series.

The string selection transistors (SST) included in the plurality of memory cell strings (NS1, NS2, NS3, . . . , NSm) may be commonly connected to the string selection line SSL. Memory cells formed in the same row among a plurality of memory cells (MC) included in the plurality of memory cell strings (NS1, NS2, NS3, . . . , NSm) may be commonly connected to corresponding word lines (WL1, WL2, WL3, WL4, . . . , WL(n−1), WLn). The ground selection transistors (GST) included in the plurality of memory cell strings (NS1, NS2, NS3, . . . , NSm) may be commonly connected to the ground selection line GSL.

The ground selection transistors (GST) included in the plurality of memory cell strings (NS1, NS2, NS3, . . . , NSm) may be commonly connected to the common source line (CSL).

The string selection transistors (SST) included in the plurality of memory cell strings (NS1, NS2, NS3, . . . , NSm) may be connected to the corresponding bit lines (BL1, BL2, BL3, . . . , BLm).

Here, n and m each represent a positive integer.

Referring to FIG. 2 again, the control circuit 500 receives the command signal CMD and the address signal ADDR from the solid state drive controller 20, and may control a write operation, a read operation or an erase operation of the non-volatile memory device 10 on the basis of the command signal CMD and the address signal ADDR.

For example, the control circuit 500 may generate control signals CONs on the basis of the command signal CMD and may generate a row address R_ADDR and a column address C_ADDR on the basis of the address signal ADDR. The control circuit 500 may provide the control signals CONs and the row address R_ADDR to the address decoder 200 and may provide the column address C_ADDR to the data input/output circuit 400.

The address decoder 200 may be connected to the memory cell array 100 via the string selection line SSL, the plurality of word lines WLs and the ground selection line GSL.

At the time of the write operation or the read operation, the address decoder 200 may determine one of the plurality of word lines WLs as a selected word line, and may determine the remaining word lines except the selected word line as non-selected word lines, on the basis of the row address R_ADDR provided from the control circuit 500.

The address decoder 200 may receive the word line voltages VWLs used to operate the non-volatile memory device 10 from a voltage generation unit arranged inside or outside the non-volatile memory device 10. The word line voltages VWLs may be applied to the plurality of word lines WLs via the address decoder 200.

The page buffer circuit 300 may be connected to the memory cell array 100 via a plurality of bit lines BLs.

The page buffer circuit 300 may include a plurality of page buffers. In an exemplary embodiment of the present inventive concept, one bit line may be connected to one page buffer.

In another exemplary embodiment of the present inventive concept, two or more bit lines may be connected to one page buffer.

The page buffer circuit 300 may temporarily store the data to be written to the selected page at the time of the write operation, and may temporarily store the data read from the selected page at the time of the read operation.

The data input/output circuit 400 may be connected to the page buffer circuit 300 via the data line DL.

At the time of the write operation, the data input/output circuit 400 receives write data (DATA) from the solid state drive controller 20, and may provide the write data (DATA) to the page buffer circuit 300 on the basis of the column address C_ADDR provided from the control circuit 500.

At the time of the read operation, the data input/output circuit 400 may provide read data (DATA) stored in the page buffer circuit 300 to the solid state drive controller 20, on the basis of the column address C_ADDR provided from the control circuit 500.

An example of the plurality of non-volatile memory devices 10, 11, 12 and 13 included in the solid state drive 1200 has been described above with reference to FIGS. 2 to 4, but the present inventive concept is not limited thereto. For example, each of the plurality of non-volatile memory devices 10, 11, 12 and 13 may be implemented in various forms.

Figure 5:
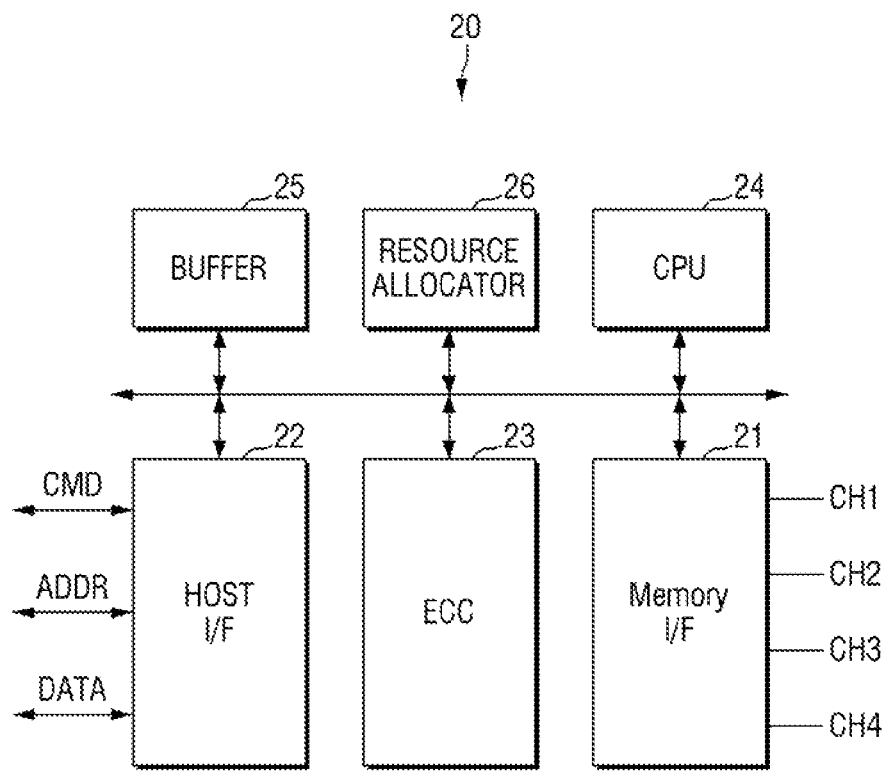
FIG. 5 is a block diagram illustrating a solid state drive controller of FIG. 1 in detail.

FIG. 5 is a block diagram illustrating the solid state drive controller of FIG. 1 in detail.

Referring to FIG. 5, the solid state drive controller 20 includes a memory interface (I/F) 21, a host interface 22, an error correction circuit (ECC) 23, a central processing unit (CPU) 24, a buffer memory 25, and a resource allocator 26.

The memory interface 21 may scatter data (DATA) transmitted from the buffer memory 25 to a plurality of channels CH1, CH2, CH3 and CH4. Further, the memory interface 21 may transfer the data (DATA) read from the plurality of non-volatile memory devices 10, 11, 12 and 13 to the buffer memory 25.

In an exemplary embodiment of the present inventive concept, the memory interface 21 may use a flash memory interface technique. In this case, the solid state drive controller 20 may execute the write operation, the read operation or the erase operation in accordance with the flash memory interface technique.

The host interface 22 may permit the interfacing of the solid state drive 1200 to correspond to the protocol of the host 1100. For example, the host interface 22 may communicate the command signal CMD, the address signal ADDR, and the data (DATA) with the host 1100, using a Universal Serial Bus (USB), a Small Computer System Interface (SCSI), a peripheral component interconnect express (PCIe), an advanced technology attachment (ATA), a Parallel ATA (PATA), a Serial ATA (SATA), a Serial Attached SCSI (SAS) and the like.

Further, the host interface 22 may execute a disk emulation function which enables the host 1100 to recognize the solid state drive 1200 as a hard disk drive (HDD).

The host interface 22 may receive data (DATA) including stream and stream information from the host 1100. This will be explained later in more detail.

The buffer memory 25 may temporarily store data (DATA) provided from the host 1100 and data (DATA) read from the plurality of non-volatile memory devices 10, 11, 12 and 13. In an exemplary embodiment of the present inventive concept, the buffer memory 25 may include a volatile memory such as a DRAM and a Static Random Access Memory (SRAM). In an exemplary embodiment of the present inventive concept, the buffer memory 25 may be a Tightly-Coupled Memory (TCM).

The error correction circuit 23 may generate an error correction code, using the data (DATA) written to the plurality of non-volatile memory devices 10, 11, 12 and 13. The error correction code may be stored in a spare area of the plurality of non-volatile memory devices 10, 11, 12 and 13. Thereafter, the error correction circuit 23 detects the error of the data (DATA) read from the plurality of non-volatile memory devices 10, 11, 12 and 13, and may correct the detected error using the error correction code.

The central processing unit 24 may analyze and process the command signal CMD and the address signal ADDR provided from the host 1100. The central processing unit 24 may communicate with the host 1100 via the host interface 22, and may control the plurality of non-volatile memory devices 10, 11, 12 and 13 via the memory interface 21. The central processing unit 24 may control the operation of the plurality of non-volatile memory devices 10, 11, 12 and 13 on the basis of firmware for driving the solid state drive 1200.

The resource allocator 26 adjusts a resource of the solid state drive 1200 on the basis of the stream and stream information received by the host interface 22. The resource of the solid state drive 1200 may be a resource necessary for the solid state drive controller 20 to write the data (DATA) to the non-volatile memory devices 10, 11, 12 and 13.

The resource allocator 26 may control the size of the buffer memory 25 allocated to the stream on the basis of the stream and the stream information.

The resource allocator 26 may control the size of the volatile memory device 40 of FIG. 1 allocated to the stream, on the basis of the stream and stream information. The volatile memory device 40 is located outside the solid state drive controller 20 and may be connected to the solid state drive controller 20.

Figure 6:
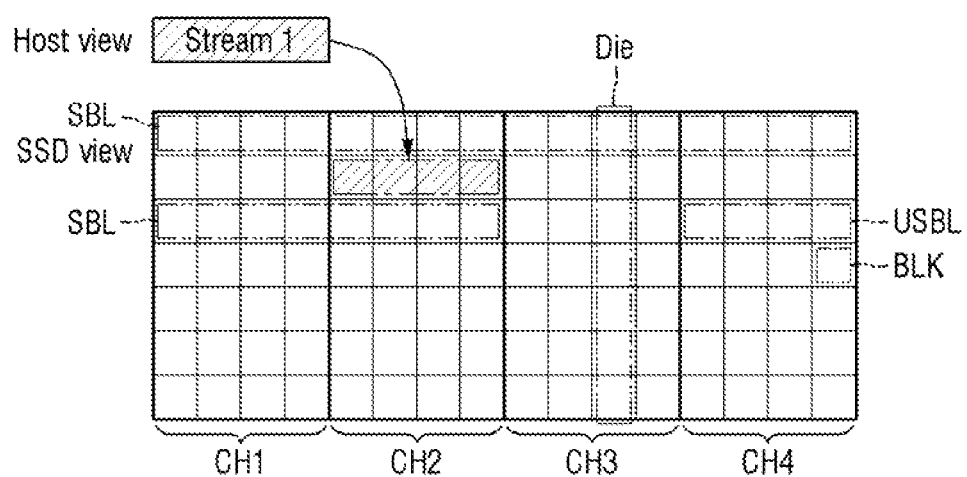
FIG. 6 is a diagram illustrating a memory allocation operation of a resource allocator of FIG. 5 in which a stream has the same size as a unit super block.

FIG. 6 is a diagram illustrating the memory allocation operation of the resource allocator of FIG. 5.

Referring to FIGS. 1, 5 and 6, the resource allocator 26 determines which area of the non-volatile memory the stream is located, and allocates each strewn to respective positions.

In a host view, a first stream (Stream 1) may be transmitted to the solid state drive 1200 via the host interface 22. At this time, the first stream (Stream 1) may have a small size unlike a conventional multi-stream device.

For example, the first stream (Stream 1) may be the same size as a unit super block USBL. This will be described later.

An SSI) view shows the storage area of the non-volatile memory devices 10, 11, 12 and 13. The storage area of the non-volatile memory devices 10, 11, 12 and 13 may include a first channel CH1, a second channel CH2, a third channel CH3 and a fourth channel CH4. Each of the channels CH1-CH4 is made up of blocks BLK of a plurality of rows and a plurality of columns. In FIG. 6, the block BLK may be a portion corresponding to each of the plurality of memory blocks BLK1, BLK2 and BLK3, and BLK4 of FIG. 1.

One column of the storage area of the non-volatile memory devices 10, 11, 12 and 13 of the SSD view may mean one die. In other words, the presence of four columns for each channel may mean four dies arranged per channel of FIG. 1.

In FIG. 6, the configuration in which each die has seven blocks BLK is illustrated, but this is merely exemplary, and the present inventive concept is not limited thereto.

The unit super block USBL may only be disposed in one channel. In other words, the unit super block USBL may only be disposed in one of the first channel CH1, the second channel CH2, the third channel CH3 and the fourth channel CH4. The unit super block USBL may include the blocks BLK of the plurality of dies connected to the associated channel. In other words, since four dies are located in the fourth channel CH4, a maximum of four blocks BLK forming a row may be an example of the unit super block USBL. Hereinafter, the four blocks BLK will be described as being included in the unit super block USBL for convenience.

The super block SBL may include at least one unit super block USBL. The super block SBL may include at least one unit adjacent super block USBL. In other words, the super block SBL may include the unit super block USBL of the same row located in the adjacent channel. In this case, as long as the super blocks are adjacent to each other, four unit super blocks USBL adjacent to each other over four channels CH1-CH4 may form the super block SBL.

In addition, the unit super blocks USBL located in the same channel and just below or just above each other may form the super block SBL. For example, the plurality of unit super blocks USBL may form a super block SBL horizontally and vertically in two channels.

A super block SBL may include the unit super block USBL located in an adjacent region, since the streams allocated to the super block SBL have similar attributes, for example, similar survival times (Time-To-Live (TTL)). Therefore, it is possible to increase the degree of concentration of a garbage collection process.

Again, considering the host view, the size of the first stream (Stream 1) may be the same as the size of the unit super block USBL. Therefore, the first stream (Stream 1) may be allocated to one of a plurality of unit super blocks USBL. However, since this is not selected by the host 1100, but is instead determined by the solid state drive 1200, the first stream (Stream 1) may not be allocated to a location with good write efficiency.

FIG. 7 is an exemplary diagram illustrating the memory allocation operation of the resource allocator of FIG. 5.

Referring to FIGS. 6 and 7, as illustrated in the host view, data (DATA) may be divided into multiple streams (Stream 1, Stream 2, Stream 3 and Stream 4) in a data interleaving or data striping manner. In the case of the four streams, best efficiency may be achieved if each stream is written to each of the four channels CH1-CH4.

However, as illustrated in FIG. 6, since it is not determined which channel and which position the first stream (Stream 1) is allocated, an inefficient arrangement as illustrated in FIG. 7 is also possible.

For example, when the first stream (Stream 1) is allocated to the first row of the second channel CH2, the second stream (Stream 2) is allocated to the second row of the first channel CH1, the third stream (Stream 3) is allocated to the third row of the second channel CH2, and the fourth stream (Stream 4) is allocated to the first row of the fourth channel CH4, since the first stream (Stream 1) and the third stream (Stream 3) need to be written at the same time to the second channel CH2, the write performance may not be maximized. However, a solid state drive according to the embodiment of the inventive concept shown in FIG. 5 may operate to maximize the write performance. This will be explained below.

FIG. 8 is a block diagram illustrating the solid state drive controller of FIG. 1 in detail, and FIG. 9 is an exemplary table illustrating the mapping table of FIG. 8. FIG. 10 is an exemplary table illustrating the grouping table of FIG. 8.

FIG. 8 is a block diagram illustrating the internal operation of the solid state drive controller 20 of FIG. 5. A mapping table 29, a stream group manager 31, a stream pool 27, a physical block pool 28 and the like of FIG. 8 may be functional blocks implemented by the central processing unit (CPU) 24, the memory interface 21, and/or the buffer memory 25 of FIG. 5.

Referring to FIGS. 1 and 8 to 10, the solid state drive controller 20 may include the host interface 22, the stream group manager 31, the stream pool 27, the physical block pool 28, the resource allocator 26, and the mapping table 29.

The host 1100 may group streams that have similar attributes. In this case, the grouping according to similar attributes may be determined on the basis of which performance factor is needed, in consideration of hot/cold attributes of each stream, survival time and the like. In other words, in the case of a stream in which writing and updating are frequently performed, since quick writing is indispensable, it is necessary to have a high performance factor. However, in the case of a stream which requires a long survival time, the performance factor may be relatively low.

The host interface 22 may receive stream data and stream information from the host 1100. The stream data may be in the form of a stream group. The stream information may include a stream group attribute. The stream group attribute may be the number of streams included in the stream group, and the performance factor.

When the number of channels of the non-volatile memory devices 10, 11, 12 and 13 is four, the maximum number of streams that can be allocated to the blocks having the same number in different dies may be four. In other words, since one stream corresponds to one unit super block, the number of streams is selected from one to four. The number of performance factors may not be greater than the number of streams. In other words, if four streams are included in the stream group, they may have a maximum of four performance factors and naturally have lower performance factors.

The performance factor may be a type of write speed. In other words, in the case of a stream group with a performance factor of 4, four streams are written to four channels and this may have the highest efficiency. When the performance factor is 2, if the number of streams is 4, the streams are written to two channels, and the write may be executed slower than the case where the performance factor is 4.

The stream group manager 31 may record the grouping table via the stream information received from the host 1100. FIG. 10 illustrates an example of a grouping table. In other words, it is possible to know what group a particular stream belongs to. For example, in FIG. 10, group 1 may include streams 1, 2, 3 and 4, group 2 may include streams 5, 6, 7 and 8, group 3 may include streams 9 and 10 and group 4 may include stream 11.

The stream pool 27 may include stream data received by the host interface 22. In the stream pool 27, streams allocated to the memory are excluded, and only streams that have not yet been allocated remain. In this embodiment of the present inventive concept, since streams exist in a stream group, streams may be added to and excluded from the stream pool 27 in the unit of a stream group.

The physical block pool 28 may include free blocks remaining in the non-volatile memory devices 10, 11, 12 and 13. The free blocks inside the physical block pool 28 may be excluded from the physical block pool 28 if the resource allocator 26 allocates a stream in the stream pool 27 to the physical block pool 28.

The resource allocator 26 may refer to the group information of the streams from the stream group manager 31 to define a super block of the physical blocks in the physical block pool 28. The resource allocator 26 may allocate the stream group existing in the stream pool 27 to the super block SBL.

For example, the resource allocator 26 may determine the size of the super block SBL depending on the performance factor. The performance factor may determine how many channels the super block SBL corresponds to or how many unit super blocks USBL the super block SBL includes. In other words, when the performance factor is 4, the super block SBL corresponds to four channels and may include four unit super blocks USBL.

Subsequently, the resource allocator 26 may determine the position of the super block SBL according to the number of streams included in the stream group. The position of the super block SBL may be determined to be in an empty free block, by considering how many channels correspond to the super block SBL. For example, the super block SBL may be put in an empty free block if the size of the empty free block is large enough to accommodate the super block SBL. The number of channels may be determined by the size of the super block SBL.

Subsequently, the resource allocator 26 may allocate the stream group to the determined super block SBL.

The resource allocator 26 may transfer the current status of the grouping received from the stream group manager 31 to the host interface 22, and the host interface 22 may transmit the stream group information to the host 1100.

The mapping table 29 may record which physical block the stream is allocated to when the stream is allocated. The mapping table 29 may be updated with updating of the stream allocation. FIG. 9 is an exemplary view of the mapping table 29. For example, as shown in FIG. 9, the first stream corresponds to physical blocks 0, 4, 8, 12, . . . and the second stream corresponds to physical blocks 1, 2, 9, 10, . . . .

Figure 11:
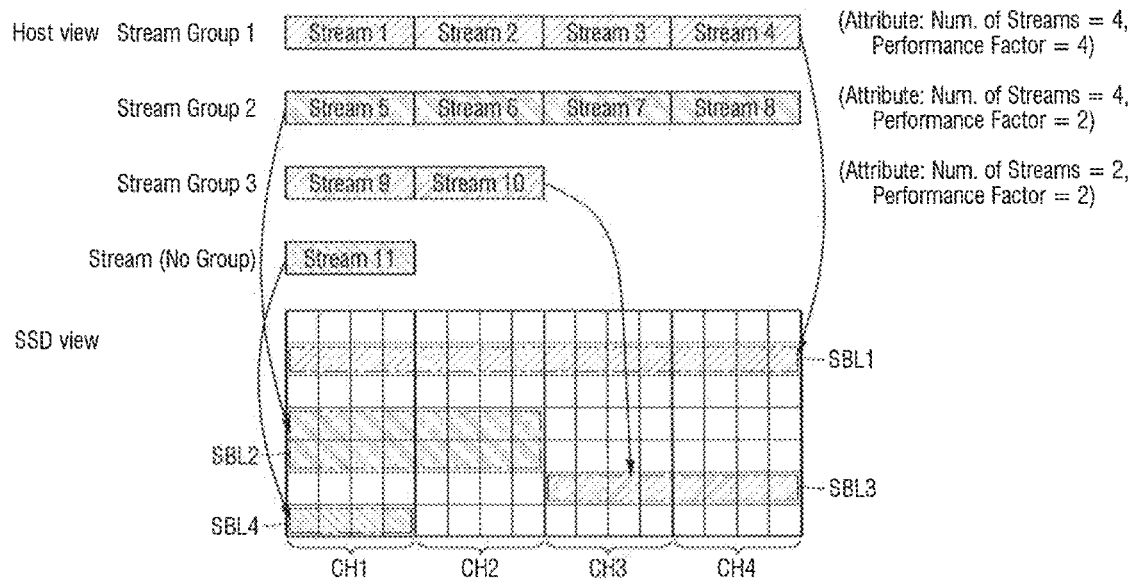
FIG. 11 is a diagram illustrating a grouping operation of the resource allocator of FIG. 5.

FIG. 11 is a diagram illustrating the grouping operation of the resource allocator of FIG. 5.

Referring to FIGS. 8 and 11, in the host view, the host 1100 may group and transmit multiple streams.

For example, the first to fourth streams (Streams 1, 2, 3 and 4) may belong to a first stream group (Stream Group 1). The first stream group (Stream Group 1) includes four streams as stream information and may have a performance factor of 4.

The fifth to eighth streams (Streams 5, 6, 7 and 8) may belong to a second stream group (Stream Group 2). The second stream group (Stream Group 2) includes four streams as stream information and may have a performance factor of 2.

The ninth and tenth streams (Streams 9 to 10) may belong to the third stream group (Stream Group 3). The third stream group (Stream Group 3) includes two streams as stream information, and may have a performance factor of 2.

An eleventh stream (Stream 11) may not belong to the fourth stream group or any group (No Group). In such a case, its stream information may not be separately required.

Since the first stream group (Stream Group 1) includes four streams and the performance factor is 4, it may be allocated to the first super block SBL1 corresponding to the four channels CH1-CH4 by the resource allocator 26.

Since the second stream group (Stream Group 2) includes four streams but has a performance factor of 2, it may be allocated to the second super block SBL2 corresponding to the two channels CH1 and CH2 by the resource allocator 26.

Since the third stream group (Stream Group 3) includes two streams and has a performance factor of 2, it may be allocated to the third super block SBL3 corresponding to the two channels CH3 and CH4 by the resource allocator 26.

Since the eleventh stream (Stream 11) does not constitute a group, it may be allocated to the fourth super block SBL4 corresponding to one channel, e.g., CH1, by the resource allocator 26. The fourth super block SBL4 may include only a single unit super block.

Figure 12:
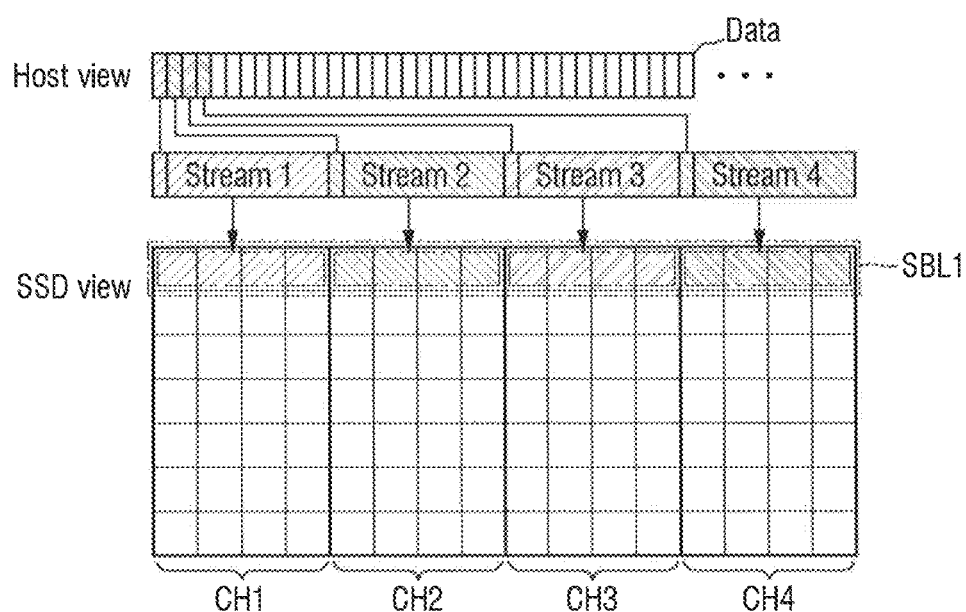
FIG. 12 is an exemplary diagram illustrating the performance of the resource allocator of FIG. 5.

FIG. 12 is an exemplary diagram illustrating the performance of the resource allocator of FIG. 5.

Referring to FIGS. 8 and 12, the first to fourth streams (Streams 1, 2, 3 and 4) may be specified as a single stream group. In such a case, the resource allocator 26 recognizes that the group includes the four streams and the performance factor is 4. Therefore, the resource allocator 26 may write the stream group to the four respective channels. This may be a method in which the four streams are most efficiently and quickly written.

In the case of conventional multi-stream applications, although the sizes of the streams requested by the hosts are different, since the super blocks containing all the dies of all the channels are allocated, the efficiency of memory management may be low. Additionally, since they do not manage which channel region a stream is allocated to, a stream may be allocated to a channel having the same super block, and thus, write performance is lowered.

In contrast, the solid state drive according to exemplary embodiments of the present inventive concept may execute the memory allocation operation with high efficiency all the time, irrespective of the size of the stream group which changes depending on the number of streams.

In addition, for a stream which may be written at relatively low performance, it is possible to implement an optimized resource allocation by adjusting the speed to be low.

Figure 13:
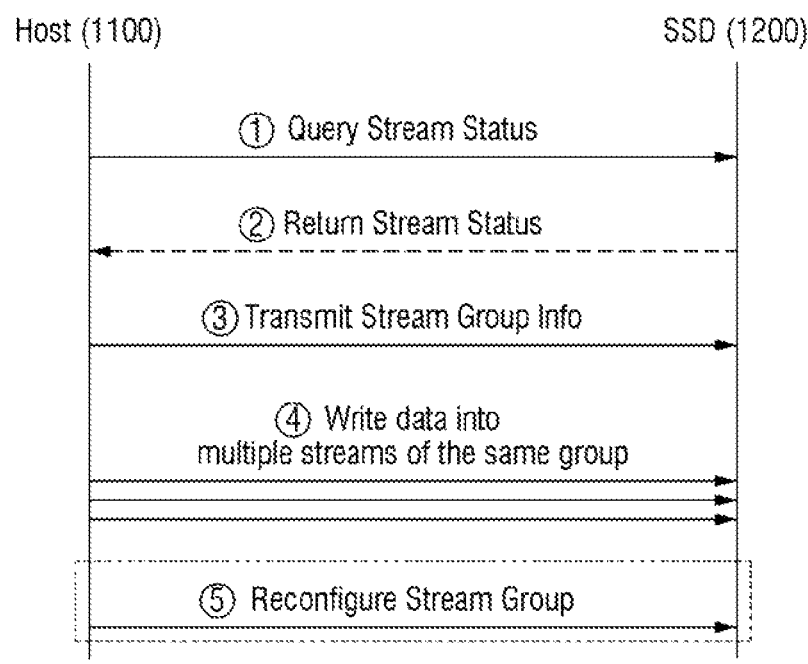
FIG. 13 is a diagram illustrating a command flow between the solid state drive and the host of FIG. 1.

FIG. 13 is a diagram illustrating a command flow between the solid state drive and the host of FIG. 1.

Referring to FIGS. 1 and 13, the host 1100 first queries the solid state drive 1200 about the stream status (1).

Subsequently, the solid state drive 1200 responds to the host 1100 by returning the current status of the stream (2). At this time, the current status of the stream may include information on the group of the current stream and whether or not the memory of the stream group can be allocated.

Subsequently, the host 1100 transmits the stream information of the stream group (3). At this time, the stream information may include the performance factor, the number of streams included in the stream group, IDs of each stream, and the like.

Subsequently, data of multiple streams in the same group and may be transferred to the solid state drive 1200 (4).

Next, the host 1100 may optionally reconstruct or reconfigure a stream group (5).

The solid state drive according to the embodiment just described may perform an efficient light operation by performing grouping on the basis of the attributes of streams. In other words, in the case of a stream group with a high performance factor, it is possible to perform the write operation at high speed by way of a parallel write operation of each channel. However, in the case of a stream group with a low performance factor, only some channels may be used for the write operation to thereby efficiently utilize resources. Therefore, the performance of the write operation of the solid state drive 1200 may operate at the optimum speed.

Hereinafter, the solid state drive according to exemplary embodiments of the present inventive concept will be described with reference to FIGS. 1, 8, and 14. Descriptions of elements and/or functions already described above with reference to the figures may not be provided.

Figure 14:
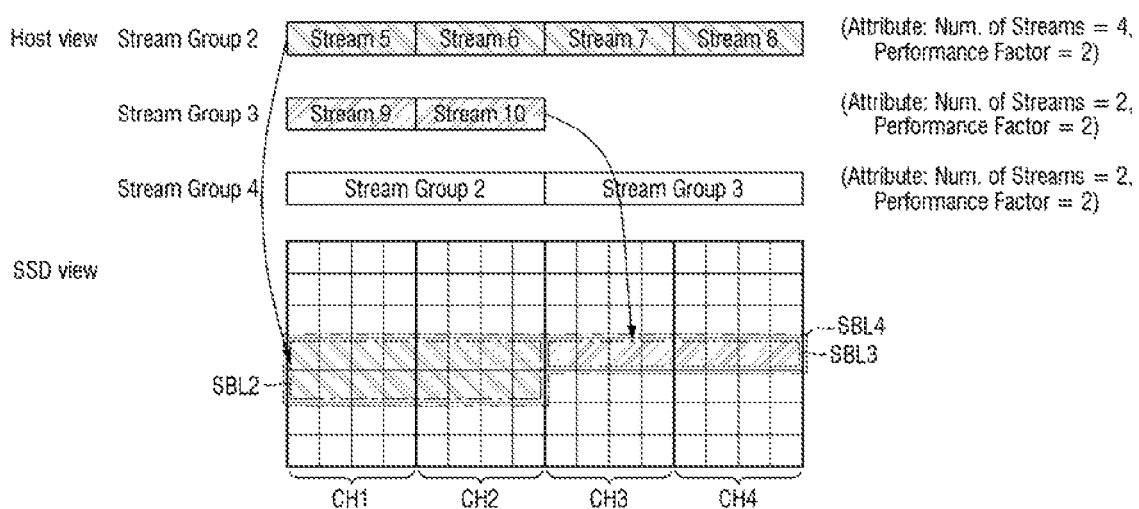
FIG. 14 is a diagram illustrating the operation of the solid state drive according to an exemplary embodiment of the present inventive concept in which a host defines upper groups.

FIG. 14 is a diagram illustrating the operation of a solid state drive according to an exemplary embodiment of the present inventive concept.

Referring to FIGS. 1, 8, and 14, the host 1100 may define upper groups and the upper groups may include already defined groups.

For example, in the host view, the fourth stream group (Stream Group 4) may be an upper group which includes the second stream group (Stream Group 2) and the third stream group (Stream Group 3). In this case, the resource allocator 26 allocates the second stream group (Stream Group 2) to the second super block SBL2 corresponding to the two channels CH and CH2, and allocates the third stream group (Stream Group 3) to the third super block SBL3 corresponding to the two channels CH3 and CH4. This may happen because the performance factor of the second stream group (Stream Group 2) and the third stream group (Stream Group 3) is 2.

Therefore, the fourth stream group (Stream Group 4) may include two streams (stream groups 2 and 3) and may have a performance factor of 2. Therefore, the second stream group (Stream Group 2) and the third stream group (Stream Group 3) which are elements of the fourth stream group (Stream Group 4) are allocated to channels different from each other. Therefore, the fourth super block SBL4 may include a second super block SBL2 corresponding to the first channel CH1 and the second channel CH2, and a third super block SBL3 corresponding to the third channel CH3 and the fourth channel CH4 different from the second super block SBL2.

In this embodiment, it is possible to maximize the performance of the write operation of the solid state drive among the groups through efficient resource distribution.

Hereinafter, the solid state drive according to an exemplary embodiment of the present inventive concept will be described with reference to FIGS. 1 and 15 to 17. Elements and/or functions described above with reference to the figures may be omitted.

Figure 15:
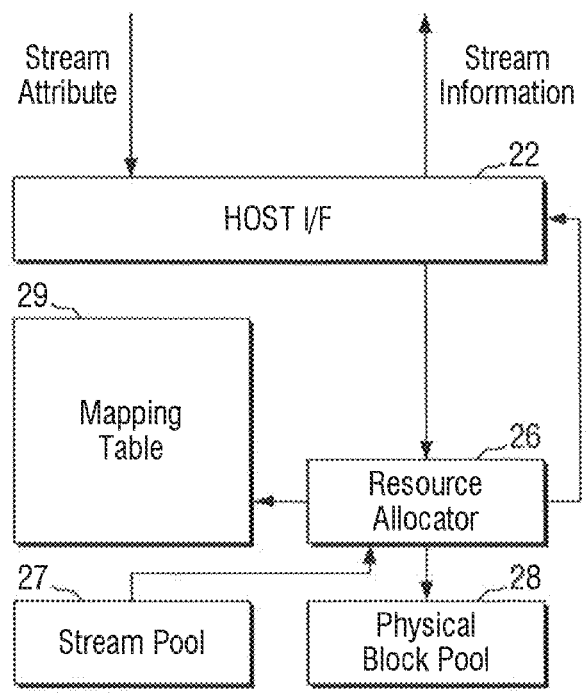
FIG. 15 is a block diagram illustrating a solid state drive according to an exemplary embodiment of the present inventive concept.
Figure 16:
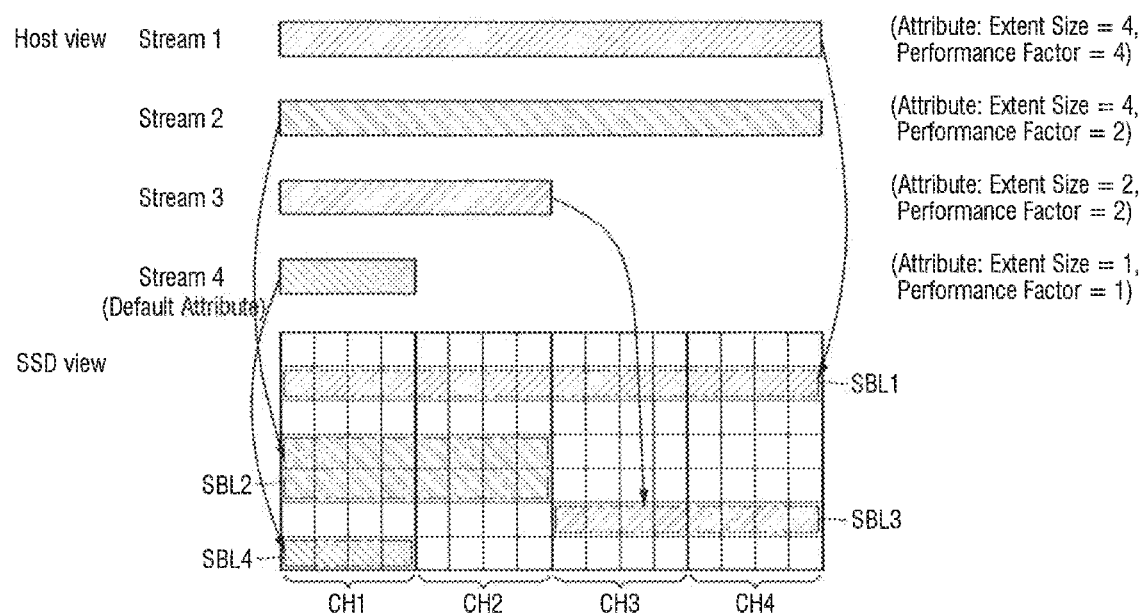
FIG. 16 is a diagram illustrating the operation of the resource allocator of FIG. 15.

FIG. 15 is a block diagram illustrating the solid state drive according to an exemplary embodiment of the present inventive concept, and FIG. 16 is a diagram illustrating the operation of the resource allocator in FIG. 15.

Referring to FIGS. 1 and 15 to 17, the host 1100 may not group the streams. In this case, the streams are not determined to have the same size and may be determined to have different sizes. The extent size of the stream may be, e.g., an integer multiple of a unit super block.

The host interface 22 may receive the stream information, in other words, the stream attributes, from the host 1100. At this time, the stream attributes may include the extent size of the stream and the performance factor.

The resource allocator 26 may determine the size of the super block, depending on the performance factor. The resource allocator 26 may determine the position of the super block SBL depending on the extent size of the stream.

Since the first stream (Stream 1) has an extent size of 4 which is four times the unit super block and a performance factor of 4, the first stream (Stream 1) may be allocated to the first super block SBL1 corresponding to four channels CH1-CH4 by the resource allocator 26. Since the second stream (Stream 2) has an extent size of 4 which is four times the unit super block and the performance factor is 2, the second stream (Stream 2) may be allocated to the second super block SBL2 corresponding to the two channels CH1 and CH2 by the resource allocator 26.

Since the third stream (Stream 3) has an extent size of 2 which is twice the unit super block, and a performance factor of 2, the third stream (Stream 3) may be allocated to the third super block SBL3 corresponding to the two channels CH3 and CH4 by the resource allocator 26. Since the fourth stream (Stream 4) has an extent size of 1 which is equal to the size of the unit super block, and a performance factor of 1, the fourth stream (Stream 4) may be allocated to the fourth super block SBL4 corresponding to one channel CH1 by the resource allocator 26.

Figure 17:
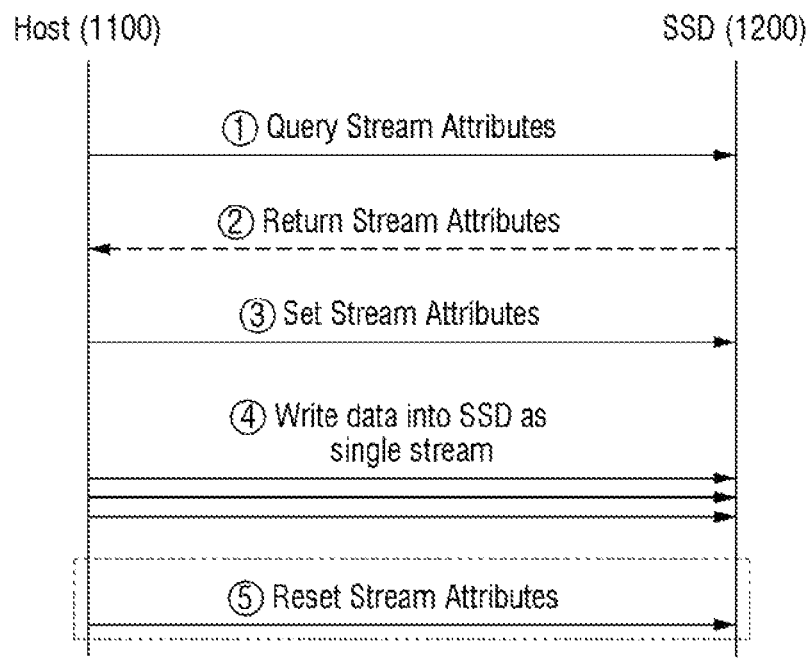
FIG. 17 is a diagram illustrating a command flow between the solid state drive including the solid state drive controller and the host of FIG. 15.

FIG. 17 is a diagram illustrating a command flow between the solid state drive and the host including the solid state drive controller of FIG. 15.

Referring to FIGS. 1 and 17, first, the host 1100 queries the solid state drive 1200 about the stream attributes (1).

Subsequently, the solid state drive 1200 responds to the host 1100 about the current status of the stream (2). In other words, stream attributes are provided to the host 1100. In this case, the stream attributes may include information on a list representing the attributes of the current stream and whether or not the memory can be allocated depending on the stream attributes.

Subsequently, the host 1100 transmits and sets the stream information on the stream attributes (3). The stream information may include a performance factor, an extent size of the stream, IDs of each stream, and the like.

Subsequently, the data of the stream may be transferred and written to the solid state drive 1200 as a single stream (4).

Next, the host 1100 may optionally reset the stream attributes (5).

The solid state drive according to the present embodiment may efficiently allocate and write a stream of a single attribute to the memory, depending on its size and the performance factor. In other words, as stream sizes vary, it is possible to prevent unnecessary actions while maintaining the write performance with maximum efficiency depending on the performance factor.

Further, in the present embodiment, since the host 1100 does not need to perform a grouping, a computation amount of the host 1100 can be reduced. For example, since the resource allocator 26 of the solid state drive controller 20 handles such computations, the burden on the host 1100 can be reduced.

Hereinafter, the solid state drive according to an exemplary embodiment of the present inventive concept will be described with reference to FIGS. 1, 15 and 18. Elements and/or functions described above with reference to the figures may be omitted.

Figure 18:
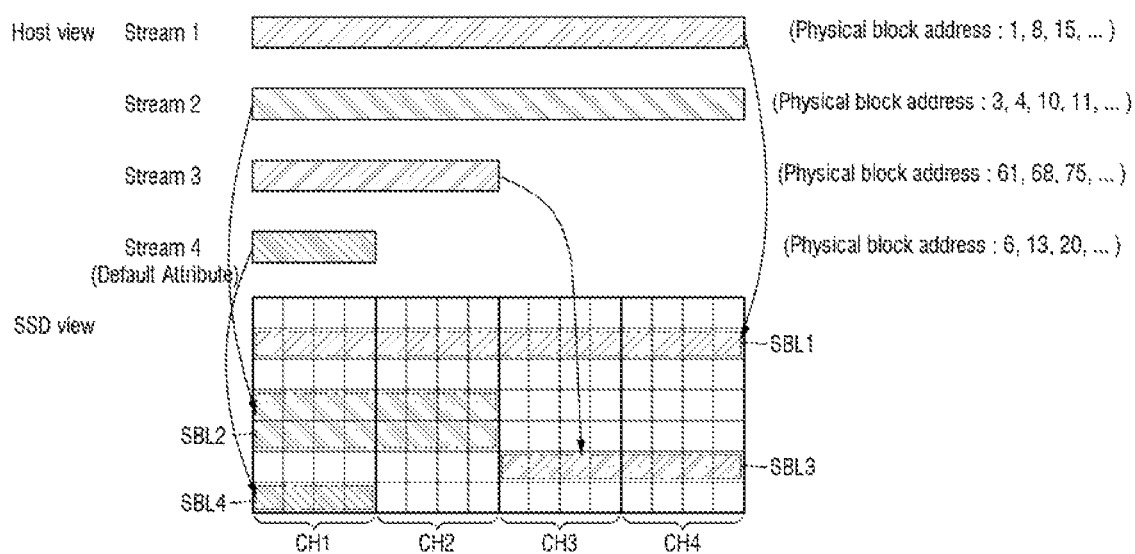
FIG. 18 is a diagram illustrating the operation of the solid state drive according to an exemplary embodiment of the present inventive concept in which the address of a physical block is completely specified.

FIG. 18 is a diagram illustrating the operation of the solid state drive according to an exemplary embodiment of the present inventive concept.

Referring to FIGS. 1, 15, and 18, a solid state drive 1200 according to an exemplary embodiment of the present inventive concept may completely specify the address of the physical block at the host 1100.

In other words, the host 1100 may directly specify and transmit the addresses of the physical blocks of each stream as stream information. For example, the first stream (Stream 1) may be written to the first super block SBL1, and the second stream (Stream 2) may be written to the second super block SBL2. The third stream (Stream 3) may be written to the third super block SBL3, and the fourth stream (Stream 4) may be written to the fourth super block SBL4. These first to fourth super blocks (SBL1 to SBL4) may be blocks specified by the host 1100.

To accomplish this, the host 1100 knows all kinds of information about the physical block of the solid state drive 1200 beforehand. For example, the host 1100 knows that the physical block address of the first stream (Stream 1) is 1, 8, 15, . . . .

Therefore, in the present embodiment, since the solid state drive 1200 does not need to intervene in the memory allocation at all, the write speed of the solid state drive 1200 may become very fast.

Hereinafter, the solid state drive according to an exemplary embodiment of the present inventive concept will be described with reference to FIGS. 1, 15, and 19. Elements and/or functions described above with reference to the figures may be omitted.

Figure 19:
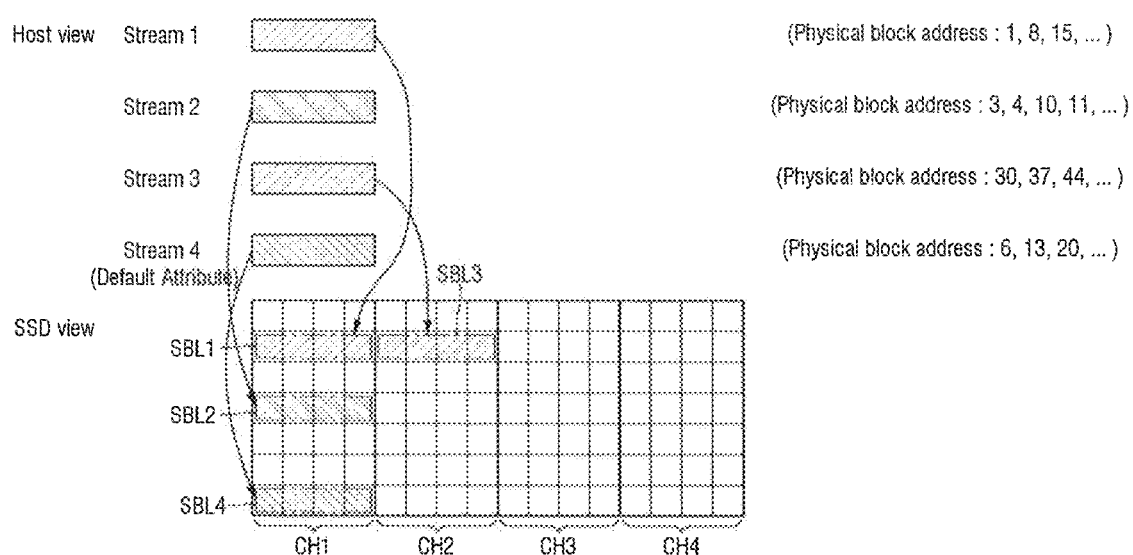
FIG. 19 is a diagram illustrating the operation of the solid state drive according to an exemplary embodiment of the present inventive concept in which the address of a physical block is completely specified and extent sizes of the streams are the same.

FIG. 19 is a diagram illustrating the operation of the solid state drive according to an exemplary embodiment of the present inventive concept.

Referring to FIGS. 1, 15 and 19, the solid state drive 1200 according to an exemplary embodiment of the present inventive concept completely specifies the address of a physical block at the host 1100, and the extent sizes of each stream may be the same.

In other words, the host 1100 may directly specify and transmit the addresses of the physical blocks of each stream as stream information. For example, the first stream (Stream 1) may be written to the first super block SBL1, and the second stream (Stream 2) may be written to the second super block SBL2. The third stream (Stream 3) may be written to the third super block SBL3, and the fourth stream (Stream 4) may be written to the fourth super block SBL4. These first to fourth super blocks SBL1 to SBL4 may be blocks specified by the host 1100.

In this embodiment, since the sizes of each stream are the same, similar streams may be allocated to adjacent positions. For example, the first super block SBL1 and the third super block SBL3 may be arranged to be adjacent to each other when the first stream (Stream 1) and the third stream (Stream 3) have similar attributes. This may have substantially the same effect as grouping performed by the host 1100.

To accomplish this, the host 1100 may know all kinds of information about the physical block of the solid state drive 1200 beforehand.

In the present embodiment, since the solid state drive 1200 does not need to intervene in the memory allocation at all, the write speed of the solid state drive 1200 may become very fast.

Hereinafter, referring to FIGS. 1, 8, and 11 to 21, a memory allocation method of a solid state drive according to an exemplary embodiment of the present inventive concept will be described. Elements and/or functions described above with reference to the figures may be omitted.

Figure 20:
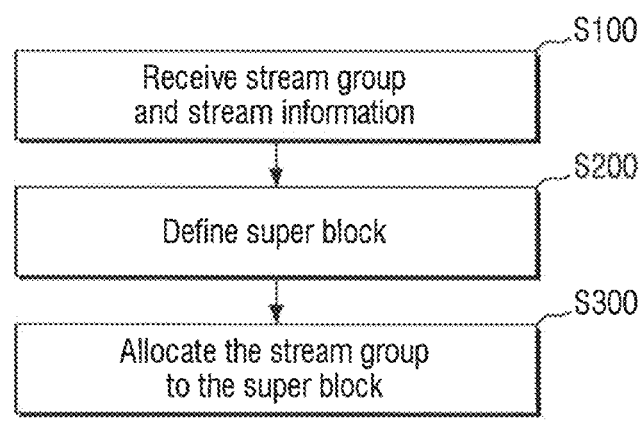
FIG. 20 is a flowchart illustrating a memory allocation method of the solid state drive according to an exemplary embodiment of the present inventive concept in which stream group and stream information are received.
Figure 21:
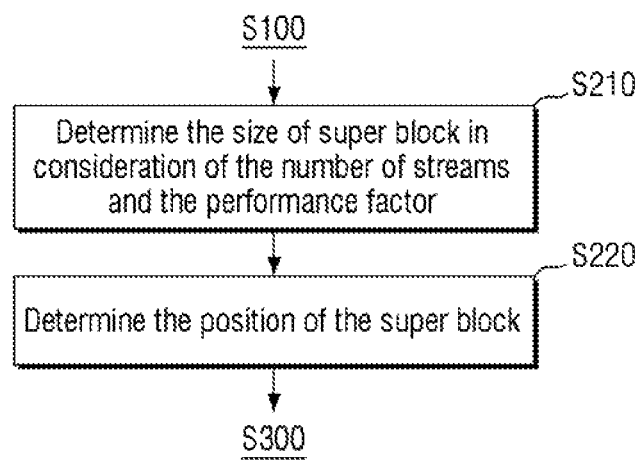
FIG. 21 is a flowchart illustrating the super block definition steps of FIG. 20 in detail.

FIG. 20 is a flowchart illustrating the memory allocation method of the solid state drive according to an exemplary embodiment of the present inventive concept, and FIG. 21 is a flowchart illustrating the super block definition steps of FIG. 20 in detail.

First, referring to FIG. 20, stream group and stream information are received (S100).

For example, referring to FIGS. 1, 8, and 11, the host interface 22 may receive stream data and stream information from the host 1100. Here, the stream data may include a stream group. The stream information may include a stream group attribute. The stream group attribute may be the number of streams included in the stream group, and the performance factor.

Referring to FIG. 20 again, the super block SBL is defined (S200).

Referring to FIG. 21, first, the size of the super block SBL is determined in consideration of the number of streams and the performance factor (S210).

For example, referring to FIGS. 1, 8 and 11, the resource allocator 26 may determine the size of the super block SBL depending on the performance factor. The performance factor may determine how many channels the super block SBL corresponds to or how many unit super blocks USBL the super block SBL includes. In other words, when the performance factor is 4, the super block SBL corresponds to four channels and may include four unit super blocks USBL.

Referring to FIG. 21 again, the position of the super block SBL is determined (S220).

For example, referring to FIGS. 1, 8, and 11, the resource allocator 26 may determine the position of the super block SBL depending on the number of streams included in the stream group. The position of the super block SBL may be determined to be in an empty free block, in considering how many channels the size of the super block SBL corresponds to.

Referring to FIG. 20 again, the stream group is allocated to the super block (S300).

For example, referring to FIGS. 1, 8, and 11, the resource allocator 26 may allocate the stream group to the determined super block SBL.

Hereinafter, referring to FIGS. 1, 15, 16, 22, and 23, the memory allocation method of the solid state drive according to an exemplary embodiment of the present inventive concept will be described. Elements and/or functions described above with reference to the figures may be omitted.

Figure 22:
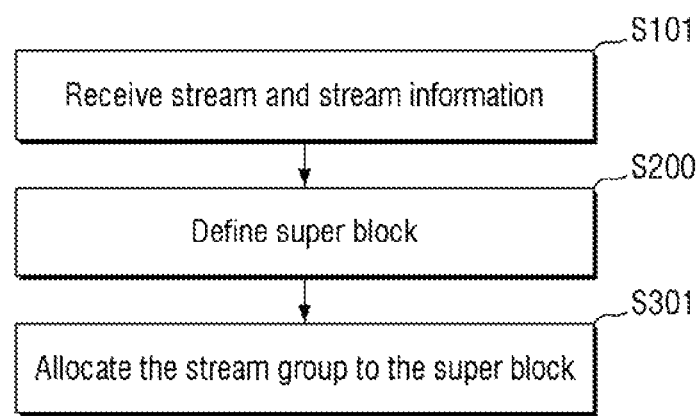
FIG. 22 is a flowchart illustrating a memory allocation method of the solid state drive according to an exemplary embodiment of the present inventive concept in which a stream attribute is received.

FIG. 22 is a flowchart illustrating the memory allocation method of the solid state drive according to an exemplary embodiment of the present inventive concept, and FIG. 23 is a flowchart illustrating the super block definition steps of FIG. 22 in detail.

First, referring to FIG. 22, the stream and stream information are received (S101).

For example, referring to FIGS. 1, and 16, the host interface 22 may receive the stream information, in other words, the stream attribute, from the host 1100. At this time, the stream attribute may include the extent size of the stream and the performance factor.

Referring to FIG. 22 again, the super block SBL is defined (S200).

Referring to FIG. 23, first, the size of the super block SBL is first determined in consideration of the extent size of the stream and the performance factor (S211).

For example, referring to FIGS. 1, 15 and 16, the resource allocator 26 may determine the size of the super block SBL, depending on the performance factor.

Referring to FIG. 23 again, the position of the super block SBL is determined (S221).

For example, referring to FIGS. 1, 15 and 16, the resource allocator 26 may determine the position of the super block SBL, depending on the extent size of the stream.

Referring to FIG. 22 again, the stream group is allocated to the super block SBL (S301).

For example, referring to FIGS. 1, 15 and 16, the resource allocator 26 may allocate the stream to the determined super block SBL.

While the present inventive concept has been particularly illustrated and described with reference to exemplary embodiments thereof, it will be understood by those of ordinary skill in the art that various changes in form and detail may be made therein without departing from the spirit and scope of the present inventive concept as defined by the following claims.

What is claimed is:

1. A solid state drive, comprising:
   a plurality of non-volatile memories, each of the non-volatile memories connected to a channel, the channel connected to at least one way connected to a die;
   a host interface configured to receive stream data including a first stream group including a first stream having a first size and a second stream group including a second stream having a second size different from the first size, and stream information corresponding to the first and second groups, from a host; and
   a resource allocator configured to allocate the stream data to super blocks of the plurality of non-volatile memories on the basis of the stream information,
   wherein the super blocks include a first super block including a first number of unit super blocks and a second super block including a second number of unit super blocks,
   the first number of unit super blocks is different from the second number of unit super blocks,
   the unit super block includes a block of a first die corresponding to a first channel and connected to a plurality of the ways connected to the first channel,
   the resource allocator allocates the first stream group to the first super block on the basis of the stream information and the second stream group to the second super block on the basis of the stream information,
   wherein the stream information includes a number of streams included in the first stream group and a performance factor of the first stream group, and wherein the resource allocator determines how many unit super blocks the first super block includes based on the number of the streams and the performance factor.

2. The solid state drive of claim 1, wherein the unit super blocks included in the first super block are adjacent to each other.

3. The solid state drive of claim 1, wherein the number of the streams is larger than or equal to the performance factor.

4. The solid state drive of claim 1, further comprising:
   a stream group manager which stores information about the first stream group to which the first stream belongs.

5. The solid state drive of claim 1, wherein the first stream includes a single stream, and
   the resource allocator allocates the first stream to the first super block.

6. The solid state drive of claim 5, wherein the stream information includes an extent size of the first stream and a performance factor of the fig stream.

7. The solid state drive of claim 6, wherein the resource allocator determines how many unit super blocks the first super block includes based on the extent size of the first stream and the performance factor of the first stream.

8. The solid state drive of claim 1, wherein the first stream includes a single stream, and
   the resource allocator determines an allocation position of the first stream.

9. A solid state drive, comprising:
   a plurality of non-volatile memories; and
   a solid state drive controller which receives a plurality of streams and stream information from a host, defines a position and a size of a super block in which each of the streams is to be stored in the non-volatile memories according to the stream information, and allocates each of the streams to its corresponding super block, wherein the solid state drive controller includes:

a host interface winch receives the streams and the stream information from the host, a resource allocator which allocates each of the streams to its super block according to the stream information, a stream pool which include only unallocated streams, and a physical block pool which includes free blocks remaining in the non-volatile memories, wherein the stream information includes a number of streams included in a stream group and a performance factor of the stream group, and wherein the resource allocator determines how many unit super blocks the super block includes based on the number of the streams and the performance factor.

10. The solid state drive of claim 9, wherein the solid state drive controller includes a mapping table which records the super blocks to which each of the streams is allocated.

11. The solid state drive of claim 9, wherein the stream information includes a stream group including a stream, and the solid state drive controller further includes a stream group manager that associates the stream group to the stream.

12. A memory allocation method of a solid state drive, the method comprising:

receiving stream data and stream information, at the solid state drive, from a host;

defining a super block in a non-volatile memory of the solid state drive on a basis of the stream information, the super block including a unit super block, the unit super block corresponding to a channel and including a block of a die connected to a plurality of ways connected to the channel and the unit super block being the same size as each of a plurality of different streams; and allocating the stream data to the super block, wherein the stream information includes a number of streams included in a stream group and a performance factor of the stream group, and determining how many unit super blocks the super block includes based on the number of the streams and the performance factor.

13. The memory allocation method of claim 12, wherein the stream data includes a first stream, and the stream information includes an extent size of the first stream and a performance factor of the first stream.

14. The memory allocation method of claim 12, wherein the stream data includes a first stream, and the stream information includes an allocation position of the first stream.

15. The memory allocation method of claim 12, further comprising:

before receiving the stream information from the host, receiving an inquiry about a current status of a stream from the host; and responding to the host about the current status of the stream.

* * * * *